US008840250B1

(12) United States Patent
Yao et al.

(10) Patent No.: US 8,840,250 B1
(45) Date of Patent: Sep. 23, 2014

(54) PROJECTION SCREEN QUALIFICATION AND SELECTION

(75) Inventors: Ning Yao, Cupertino, CA (US); William Spencer Worley, III, Half Moon Bay, CA (US); Edward Dietz Crump, Santa Cruz, CA (US)

(73) Assignee: Rawles LLC, Wilmington, DE (US)

( * ) Notice: Subject to any disclaimer, the term of this patent is extended or adjusted under 35 U.S.C. 154(b) by 51 days.

(21) Appl. No.: 13/348,232

(22) Filed: Jan. 11, 2012

(51) Int. Cl.
*G03B 21/26* (2006.01)

(52) U.S. Cl.
USPC ............ 353/30; 353/69; 353/70; 353/42; 353/77; 353/85; 345/633; 345/634

(58) Field of Classification Search
USPC ........... 353/30, 31, 42, 46, 69, 70, 77, 85, 98, 353/99; 348/745–747, 806, 807, 808, 181, 348/189, 190, 191, 615; 349/5, 7–9; 345/633, 634
See application file for complete search history.

(56) References Cited

U.S. PATENT DOCUMENTS

| 7,364,306 | B2 * | 4/2008 | Margulis ........................ 353/31 |
| 7,384,158 | B2 * | 6/2008 | Ramachandran et al. ...... 353/70 |
| 8,118,434 | B2 * | 2/2012 | Turner et al. .................... 353/46 |
| 8,142,029 | B2 * | 3/2012 | Matsumoto et al. ............ 353/69 |
| 8,172,407 | B2 * | 5/2012 | Lim ................................. 353/69 |
| 8,269,902 | B2 * | 9/2012 | Plut .............................. 348/745 |
| 8,282,222 | B2 * | 10/2012 | Smits .............................. 353/85 |
| 8,589,796 | B2 | 11/2013 | Kjeldsen et al. |
| 2009/0168027 | A1 | 7/2009 | Dunn et al. |
| 2010/0026818 | A1 | 2/2010 | Yang et al. |
| 2010/0194872 | A1 | 8/2010 | Mathe et al. |
| 2010/0309390 | A1 * | 12/2010 | Plut .............................. 348/744 |
| 2011/0080361 | A1 | 4/2011 | Miller et al. |
| 2011/0279479 | A1 * | 11/2011 | Rodriguez ................... 345/633 |
| 2012/0075534 | A1 | 3/2012 | Katz et al. |
| 2012/0105473 | A1 * | 5/2012 | Bar-Zeev et al. ............ 345/633 |
| 2012/0113140 | A1 | 5/2012 | Hilliges et al. |
| 2012/0133140 | A1 | 5/2012 | Cornelius et al. |
| 2012/0249416 | A1 | 10/2012 | Maciocci et al. |
| 2012/0320157 | A1 | 12/2012 | Junuzovic et al. |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.
Office action for U.S. Appl. No. 13/165,543, mailed on Jul. 17, 2013, Cederlof, "Identifying Projection Surfaces in Augmented Reality Environments", 27 pages.
Office action for U.S. Appl. No. 13/165,543, mailed on Jan. 30, 2014, Cederlof, "Identifying Projection Surfaces in Augmented Reality Environments", 33 pages.

* cited by examiner

*Primary Examiner* — Sultan Chowdhury
(74) *Attorney, Agent, or Firm* — Lee & Hayes, PLLC (57) ABSTRACT

An augmented reality environment allows interaction between virtual and real objects. Various surfaces within the environment such as walls, tables, countertop, chairs, floor, ceiling, and so forth may be used as projection surfaces. Qualified projection surfaces are determined, and an initial projection surface is selected for use from these. This selection may take into account user preferences, user orientation, types of image to be projected, and so forth. Other qualified projection surfaces may have visual indicators projected thereon, indicating relative suitability for use as a projection surface.

20 Claims, 8 Drawing Sheets

PROJECTION SCREEN QUALIFICATION AND SELECTION

BACKGROUND

Augmented reality environments allow users and other real-world objects to interact with virtual or computer-generated objects and information. This interaction may involve use of projection systems configured to project images onto surfaces.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

An augmented reality environment may utilize one or more projectors configured to project images onto surfaces within the environment. The images may be still images, video, user interface elements, and so forth. The images may be projected on surfaces dedicated to projection, such as a projection screen, as well as other surfaces such as walls, floors, ceilings, window coverings, tables, and other objects in the room. This disclosure describes, in part, systems and techniques for qualifying and selecting surfaces within the environment upon which the images may be projected.

Illustrative Environment

Figure 1:
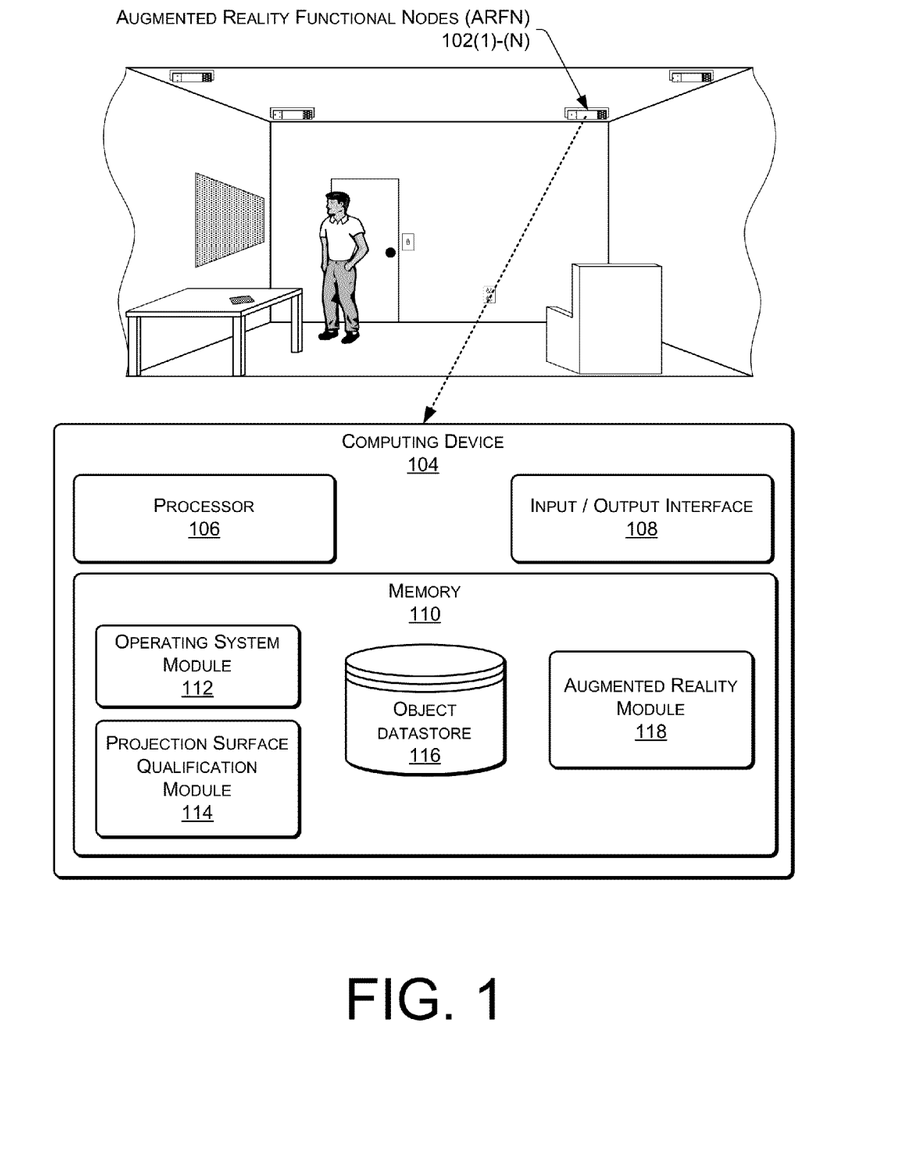
FIG. 1 shows an illustrative scene within an augmented reality environment which includes an augmented reality functional node and an associated computing device with a projection surface qualification module.

FIG. 1 shows an illustrative augmented reality environment 100 with an augmented reality functional node (ARFN) 102 having an associated computing device. In some implementations, additional ARFNs 102(1), 102(2), . . . , 102(N) may be used. The ARFN 102 may be positioned in various locations in the physical environment, such as in the corners or center of the ceiling, on a tabletop, on a floor stand, and so forth. When active, one such ARFN 102 may generate an augmented reality environment incorporating some or all of the items in the scene such as real-world objects.

Each of the ARFNs 102(1)-(N) couples to or includes a computing device 104. This computing device 104 may be within the ARFN 102, or disposed at another location and connected to the ARFN 102. The computing device 104 comprises a processor 106, an input/output interface 108, and a memory 110. The processor 106 may comprise one or more processors configured to execute instructions. The instructions may be stored in memory 110, or in other memory accessible to the processor 106.

The input/output interface 108 may be configured to couple the computing device 104 to other components such as projectors, cameras, microphones, other ARFNs 102, other computing devices 104, and so forth. The coupling between the computing device 104 and other components or devices may be via acoustic or electromagnetic communication methods. For example, the cameras may couple via Bluetooth to the computing device 104.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. Modules may be stored in the memory of the ARFN 102, storage devices accessible on the local network, or cloud storage accessible via a wide area network. An operating system module 112 is configured to manage hardware and services within and coupled to the computing device 104 for the benefit of other modules.

A projection surface qualification module 114 is configured to determine and select projection surfaces within the augmented reality environment. The projection surface qualification module 114 uses parameters of projection and surface data to select projection surfaces within a working region. The working region is a volume within which data may be projected. The working region may be defined by direction of a gaze, body orientation, and so forth. The working region is discussed below in more detail with regards to FIG. 3. The parameters of projection describe the known state of the augmented reality system and images before projection and are discussed below in more detail with regards to FIG. 4. The surface data describes the surfaces in the environment, and is discussed below with regards to FIG. 5.

An object datastore 116 is configured to maintain information about objects within or accessible to the augmented reality environment or users. These objects may be tangible real world objects or virtual objects. Tangible objects include items such as tables, chairs, animals, plants, food containers, printed books, and so forth. Information about tangible objects may include their shape, color, texture, dimensions, and so forth. Virtual objects include media content such as songs, movies, electronic books, computer generated scenes, media files, and so forth. Virtual objects may include stored copies of those objects or access rights thereto.

The object datastore 116 may include a library of pre-loaded reference objects, as well as objects which are temporally persistent within a particular environment, such as a wall, a specific table, a user and so forth. The object datastore 116 or the other datastores may be stored on one or more of the memory of the ARFN 102, storage devices accessible on the local network, cloud storage accessible via a wide area network, or distributed across one or more of these.

An augmented reality module 118 is configured to generate augmented reality output in concert with the physical environment. The augmented reality module 118 may use projected images to generate the augmented reality environment. The projection surface qualification module 114 provides one or more possible projection surfaces for use in presenting to the user projected images in at least a portion of the augmented reality environment.

Figure 2:
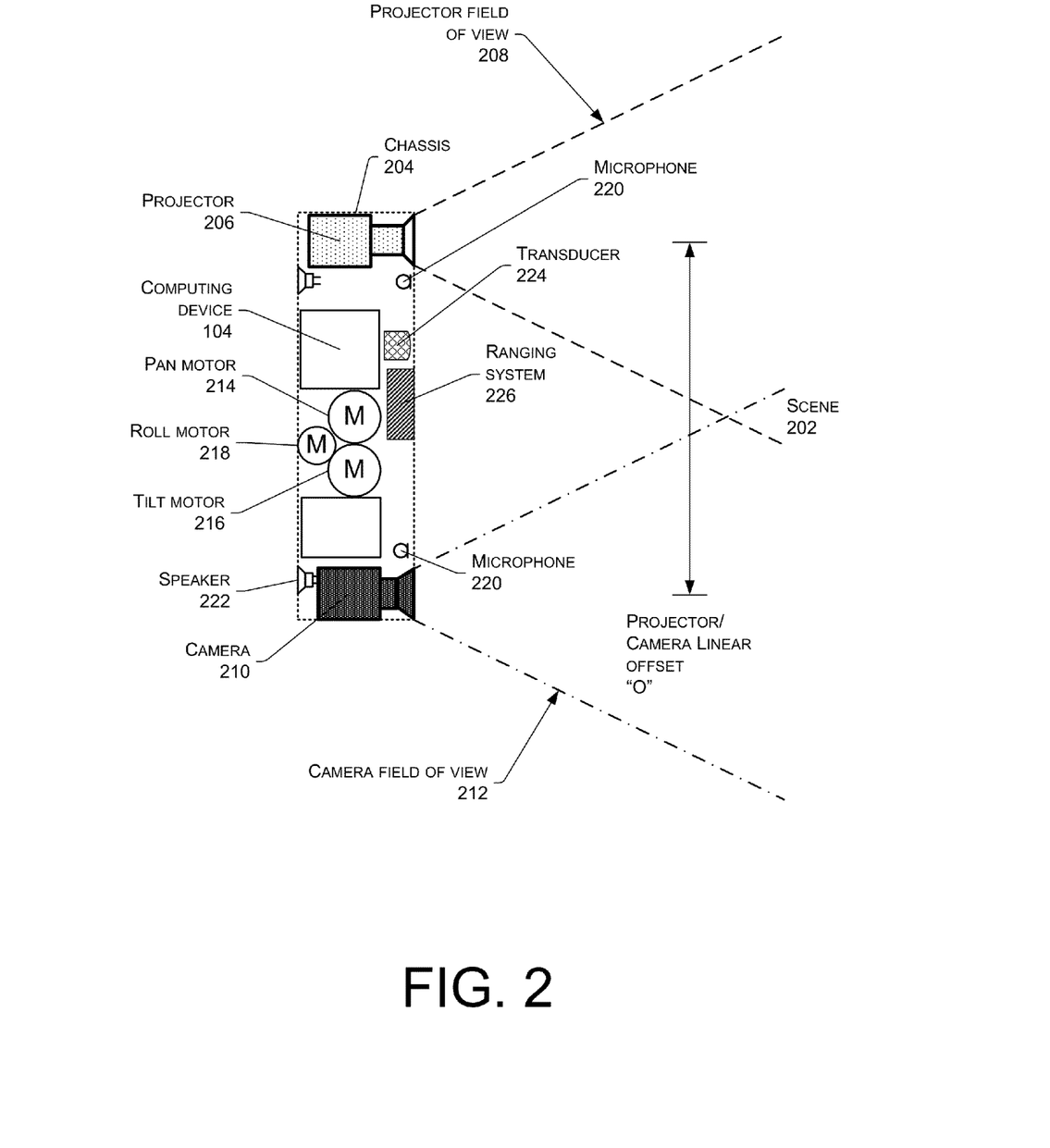
FIG. 2 shows an illustrative augmented reality functional node.

FIG. 2 shows an illustrative schematic 200 of one example of a portion of an augmented reality functional node 102 and selected components including input/output devices. The ARFN 102 is configured to scan at least a portion of a scene 202 and the objects therein. The ARFN 102 may also be configured to provide augmented reality output, such as images, sounds, and so forth.

A chassis 204 holds the components of at least a portion of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, a roll motor 218, and so forth. The pan motor 214 is configured to rotate the chassis 204 in a yawing motion changing the azimuth. The tilt motor 216 is configured to change the pitch of the chassis 204 changing the elevation. The roll motor 218 is configured to rotate the chassis 204 in a rolling motion. By panning, tilting, and/or rolling the chassis 204, different views of the scene may be acquired.

One or more microphones 220 may be disposed within the chassis 204, or elsewhere within the scene. These microphones 220 may be used to acquire input from the user, for echolocation, location determination of a sound, or to otherwise aid in the characterization of and receipt of input from the scene. For example, the user may make a particular noise, such as a tap on a wall or snap of the fingers in a particular location, which are pre-designated as inputs. The user may alternatively use voice commands.

One or more speakers 222 may also be present to provide for audible output. For example, the speakers 222 may be used to provide output from a text-to-speech module or to playback pre-recorded audio.

A transducer 224 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 226 may also be provided in the ARFN 102. The ranging system 226 may be configured to provide distance, location, or distance and location information from the ARFN 102 to a scanned object or set of objects. The ranging system 226 may comprise radar, light detection and ranging (LIDAR), ultrasonic ranging, stereoscopic ranging, and so forth. The ranging system 226 may also provide direction information in some implementations. The transducer 224, the microphones 220, the speaker 222, or a combination thereof may be configured to use echolocation or echo-ranging to determine distance and spatial characteristics.

In another implementation, the ranging system 226 may comprise an acoustic transducer and the microphones 220 may be configured to detect a signal generated by the acoustic transducer. For example, a set of ultrasonic transducers may be disposed such that each projects ultrasonic sound into a particular sector of the room. The microphones 220 may be configured to receive the ultrasonic signals, or dedicated ultrasonic microphones may be used. Given the known location of the microphones relative to one another, active sonar ranging and positioning may be provided.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a network interface and a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, the microphones 220 and the speakers 222 may be distributed throughout the scene. The projector 206 and the camera 210 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
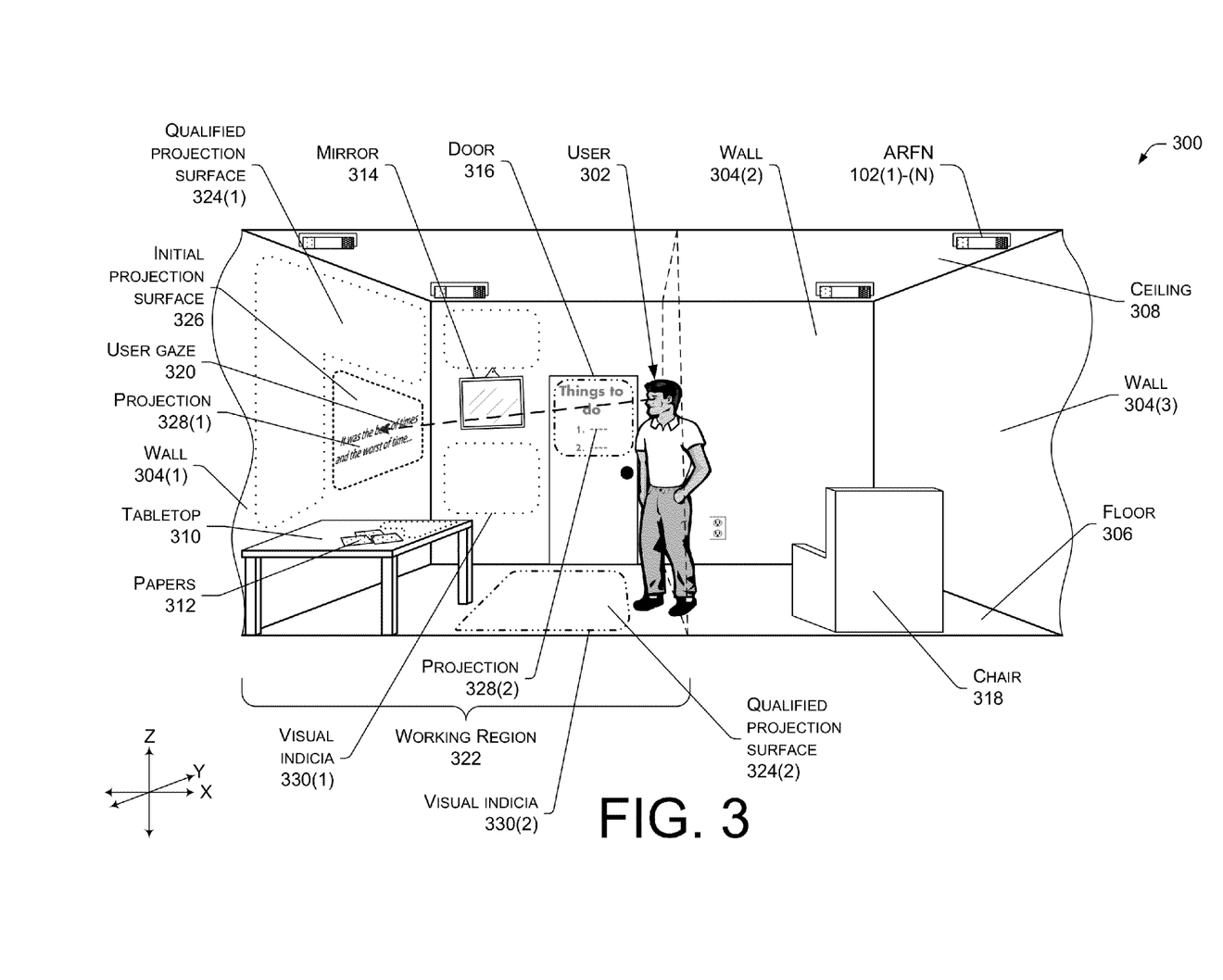
FIG. 3 illustrates a room within which an augmented reality environment is maintained.

FIG. 3 illustrates a view 300 of a room within which the augmented reality environment is maintained. Within a given physical environment, a variety of surfaces are available, some of which may be suitable to present an image from a projector. These surfaces may range in character from a heavily textured and colored carpet to a beige wall. In some implementations, particular portions or special surfaces designed to act as a projection screen may be incorporated into the environment. The projection surface qualification module 114 is configured to assess surfaces and the image to be presented, and select the surfaces or a portion thereof for projection.

In this illustration, the scene 202 comprises an augmented reality environment including a user 302. While a single user 302 is shown, it is understood that the augmented reality environment may support multiple users. Surrounding the user 302 are four walls, 304(1) in front of the user, 304(2) to the user's right, 304(3) behind the user, and 304(4) to the user's 302 left which is not shown in this illustration. The user 302 is standing on a floor 306 and above the user 302 is a ceiling 308. The walls 304, the floor 306, and the ceiling 308 are depicted as being planar for illustrative purposes and not by way of limitation. In other implementations, these surfaces may be curved, asymmetrical, include various surface features, and so forth. In front of the wall 304(1) is a tabletop 310 upon which are several papers 312. A mirror 314 is on the wall 304(2) to the right of the user 302, as is a door 316. Behind the user is a chair 318.

The augmented reality environment is maintained by multiple ARFNs 102 positioned in the corners of the ceiling 308 of the room. In other implementations one or more ARFNs 102 may be positioned at other locations within the scene. The ARFN 102 may access additional resources, such as those on the local area network, or cloud resources accessible via a wide area network.

The user 302 is facing the wall 304(1) and his gaze 320 is directed towards the wall, at a point roughly midway between the floor 306 and the ceiling 308. The user gaze 320 or other indication of the orientation of the user may be determined based on eye position, facial recognition, physical disposition of one or more body parts, and so forth. For example, the computing device 104 may use the camera 210 to gather data indicating which way the user 302 is facing. This data may be used to determine the user gaze 320.

Surrounding the user 302 in this illustration are potential projection surfaces. Based at least in part on a working region 322 some of these potential projection surfaces may be assessed to determine their suitability to present a projected image. The working region 322 shown here extends from a dashed line generally along a coronal plane of the user 302 towards the anterior portion of the user. Stated another way, the working region 322 shown here extends from the position of the user 302 in the room to the wall 304(1), and encompasses a portion of the other walls to the left 304(4) and right 304(2). The working region 322 is a volume within which the user 302 expects or prefers to have projected images presented. For example, the working region 322 may generally encompass the volume in front of the user's 302 face and within a field of view of the user's 302 eyes.

The working region 322 may be determined based at least in part upon the user gaze 320, orientation of one or more body parts, user preferences, and so forth. For example, the augmented reality module 118 may use the camera 210 and position of the ARFNs 102 to determine which way the user's 302 body is facing and use this to determine the working region 322. Or the user 302 may use a gesture to indicate a preferred working region 322. For example, the user may issue a verbal or gestural command and then sweep an arm to designate the working region 322. The working region 322 may be static or dynamically defined. For example, as described above, the working region 322 may be dynamically oriented relative to one or more parts of the user's 302 anatomy, such his eyes. A static working region 322 may be defined by the user, to include or exclude a particular portion of the environment.

Within the working region, the projection surface qualification module 114 may designate qualified projection surfaces. Shown here are various qualified projection surfaces 324(1) such as a portion of the wall 304(1), areas on the wall 304(2) to the right of the user 302, on a portion of the door 316, and so forth. The qualified projection areas 324(2) may also be on the floor, on the table 310, on the papers 312, and so forth. Shown in this illustration, the projection surface qualification module 114 has designated a generally rectangular area on the wall 304(1) as an initial projection surface 326. The selection of the initial projection surface 326 is discussed below in more depth with regards to FIG. 8. Within the initial projection surface 326 a projection 328(1) may be presented, such as text shown here projected by one or more of the ARFNs 102. Other projections 328(2) may be presented in the environment, such as reminder "to do" list on the door 316.

Portions of qualified projection surfaces 324 may be indicated with visual indicia 330. These visual indicia may be used to indicate the suitability of various surfaces for projection, designate areas within which the projection 328 may be presented, and so forth. For example, as shown here, the areas showing first visual indicia 330(1) may be better suited to high resolution graphics presentation than areas indicated by second visual indicia 330(2) which may be better suited for presentation of larger user interface prompts. The visual indicia 330 may comprise borders, images, icons, colored patches, lines, geometric figures, and so forth.

Figure 4:
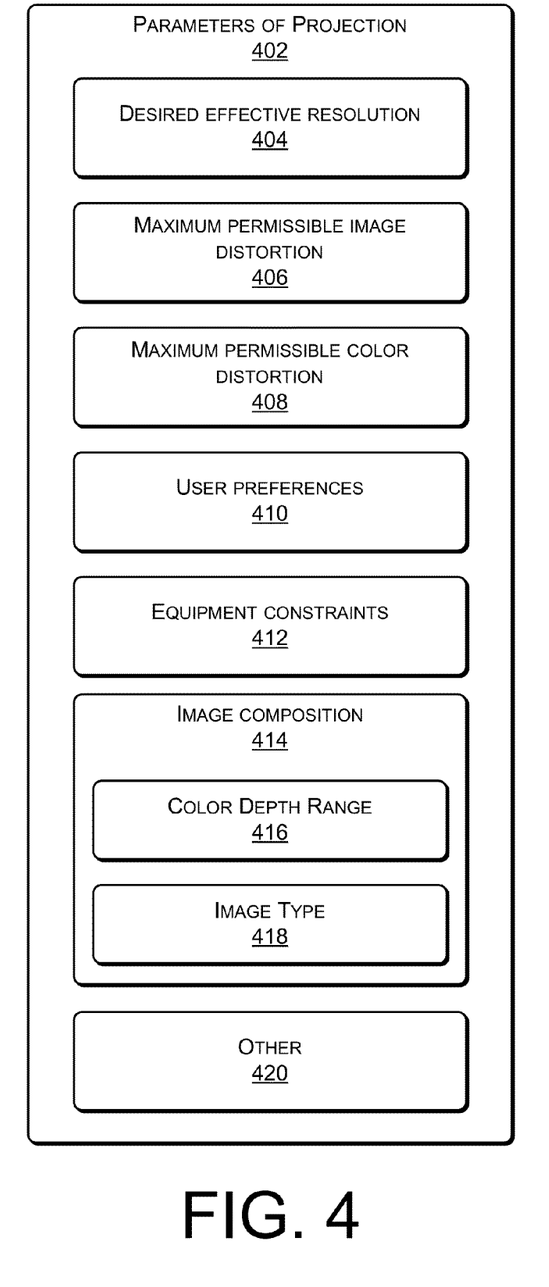
FIG. 4 illustrates parameters of projection used by the projection surface qualification and selection modules.

FIG. 4 illustrates parameters of projection 402 which may be used by the projection surface qualification module 114 to determine and select projection surfaces. The parameters of projection 402 comprise information about the image to be projected, or which is being projected by the projector 206.

The parameters of projection 402 may include a desired effective resolution 404. The desired effective resolution 404 specifies a desired effective number of pixels for a given linear measurement when the image is projected on the projection surface. For example, the desired effective resolution desired 404 may be 80 pixels per inch ("PPI"). The desired effective resolution 404 may vary based on other factors such as the content being projected. For example, text may be configured to have the desired effective resolution 404 of 120 PPI while video content may have a desired effective resolution 404 of 90 PPI. The desired effective resolution 404 may be considered in some implementations to be the actual resolution of the projected image as measured on the projection screen.

A relative angle between the projection surface and the projector as well as topography of the projection surface may distort the image during projection. For example, minimal or no image distortion may be present when the projector 206 is projecting the image onto a surface which is directly in front of and perpendicular to the projector 206. In contrast, a non-perpendicular angle between the projection surface may produce keystoning or other distortion during presentation of the image. A maximum permissible image distortion 406 may be specified. This parameter 406 defines constraints within which a projection surface may be considered acceptable or unacceptable for projection. For example, the maximum permissible image distortion 406 may define a particular range of relative angles between the projection surface and the projector 206. The maximum permissible image distortion 406 may also specify a maximum amount of deviation of the surface from planar. For example, relatively flat surfaces such as a desktop would deviate little, while bumpy surfaces such a desk littered with various objects would deviate significantly.

The parameters of projection 402 may also include a maximum permissible color distortion 408. The colors presented in a projected image may be affected by the projection surface. For example, projection of an image of a white flower onto a yellow surface would result in a yellow flower being presented to the user. The maximum permissible color distortion 408 defines color constraints within which the image itself may be adjusted prior to projection and may also indicate how far from a preferred color the image may be modified. This adjustment may be made taking into account the surface data discussed below with regards to FIG. 5.

User preferences 410 may include a particular static or dynamic working region, preferred projection height, customized color settings, presentation settings, and so forth. For example, the user 302 may set user preferences 410 such that text is to be presented at a minimum size or larger, in a particular color, and so forth. In another implementation, the user 302 may set user preferences 410 to adjust colors to compensate for a color discrimination disability, such as color blindness.

The parameters of projection 402 may also reflect equipment constraints 412. The equipment constraints 412 specify capabilities and limitations of the equipment involved in maintaining the augmented reality environment, such as in the ARFNs 102. For example, the equipment constraints 412 may specify minimum and maximum useful distances for projection of images from the projector 206, projector field of view 208 and camera field of view 212, and so forth.

Image composition 414 data may also be determined and used as part of the parameters of projection 402. The image composition 414 may comprise a color depth range 416 of the image to be presented. The color depth range 416 may comprise a data values indicating the range of one or more colors in an image. For example, the image of the flower mentioned above may have green values ranging from 139 to 243. The projection surface qualification module 114 may use the color depth range 416 to compare with the surface data to determine whether the projection surface is able to present the image for projection within the confines of the maximum permissible color distortion 408.

The image composition 414 data may also include an image type 418. The image type 418 indicates the content or general nature of the image to be presented, including but not limited to text, video, still image, user interface, and so forth. The image type 418 may be used to modify one or more of the other parameters of projection 402, such as the desired effective resolution 404, maximum permissible image distortion 406, maximum permissible color distortion 408, user preferences 410, and so forth. For example, the maximum permissible image distortion 406 may be greater for video than for a user interface.

In other implementations, other 420 parameters may be determined and used. For example, where at least a portion of the projected image or stream of images includes structured light, the parameters of projection 402 may include consideration of the camera field of view 212 to allow for recovery of structured light information and subsequent use.

Figure 5:
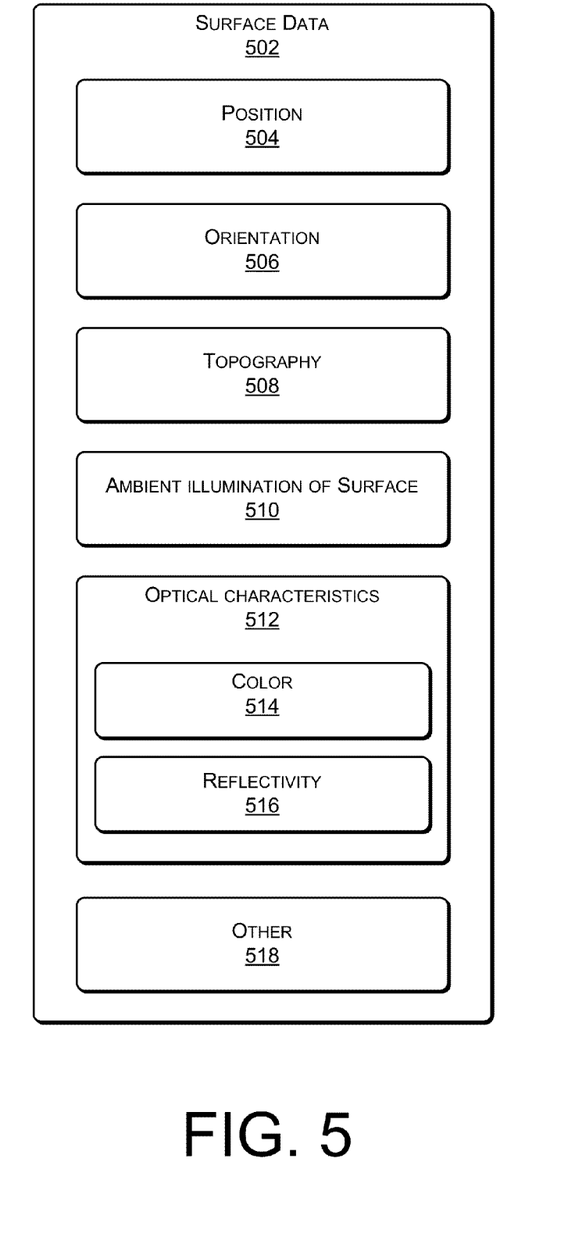
FIG. 5 illustrates surface data which may be acquired or determined for surfaces in the augmented reality environment.

FIG. 5 illustrates surface data 502 which may be determined or retrieved for surfaces in the augmented reality environment. The surface data 502 may be detected in some implementations using sensors such as the camera 206. In other implementations, the surface data 502 may be retrieved, such as from the object datastore 116. An object may be identified, such as via shape recognition, barcode, user input, radio frequency identification tag, and so forth. Once identified, the surface data 502 about the exterior of the object may be retrieved from the object datastore 116 for use by the projection surface qualification module 114. In yet another implementation, the surface data 502 resulting from detection may be combined with the surface data 502 retrieved from the object datastore 116.

The surface data 502 may comprise a position 504 of the surface within the environment. The position may be relative to one or more ARFN 102, or a defined origin within the environment. For example, the tabletop 314 is 2.5 meters directly below ARFN 102(4). The position 504 may be used to determine whether the surface is within the equipment constraints 412 such as a minimum or maximum projection distance.

Orientation 506 for a surface may be determined. The orientation 506 indicates an angle or disposition of the surface. For example, the door 320 when closed is disposed at a 50 degree angle relative to ARFN 102(3). The orientation 506 may be used to compare against the maximum permissible image distortion 406 in determining whether a surface is a possible projection surface. Continuing the example, the door 320 may have an orientation 506 which renders it unsuitable for presenting a projection from the ARFN 102(3) given a particular maximum permissible image distortion 406.

A topography 508 or surface shape may be determined. The ARFN 102 may use structured light, photometric stereo, laser scanning, and so forth to determine three-dimensional contours of at least a portion of the surface. As mentioned above, when a particular object is identifiable, the surface data 502 such as the topography 508 may be retrieved from the object datastore 114. For example, a barcode on a wall-mounted whiteboard may be used to identify the whiteboard, and the topography 508 may be inferred given data associated with that barcode.

Surface data 502 such as ambient illumination of the surface 510 may be determined. The ambient illumination of the surface 510 may be acquired by the camera 210, photosensor, and so forth and indicates the reflected or emitted light flux from the surface. For example, ambient illumination on a surface such as the tabletop 314 may be from an overhead light, sunlight from a window, and so forth.

Optical characteristics 512 of the surface may be acquired, such as color 514 and reflectivity 516. The color 516 of the surface is the apparent color of the surface. This color 516 may be assessed using ambient light, or using emitted light of a known color. For example, the projector 206 may be configured to project one or more patterns of a particular color onto a surface, while the camera 210 acquires images of the surface. By comparing the difference between the known color projected and the actual color imaged, the color 514 of the surface may be determined. In another implementation, characteristics of the ambient lighting may be known, such as a known color temperature. This information may be used in conjunction with image data acquired by the camera 210 to determine the color 514 of the surface.

The reflectivity 516 is an indication of what percentage or quantity of incident light on the surface is reflected back to an observer. For example, a matte black surface would be non-reflective while a mirror would be highly reflective. Surfaces with higher reflectivity such as mirrors may be undesirable to use as projection surfaces. Detection of mirrors or other highly reflective surfaces is described below in more detail with regards to FIG. 7.

Other 518 information about the surface may also be acquired or retrieved. For example, a surface texture, preferred angle of incidence, whether the surface topography is fixed or variable, and so forth.

Illustrative Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 6:
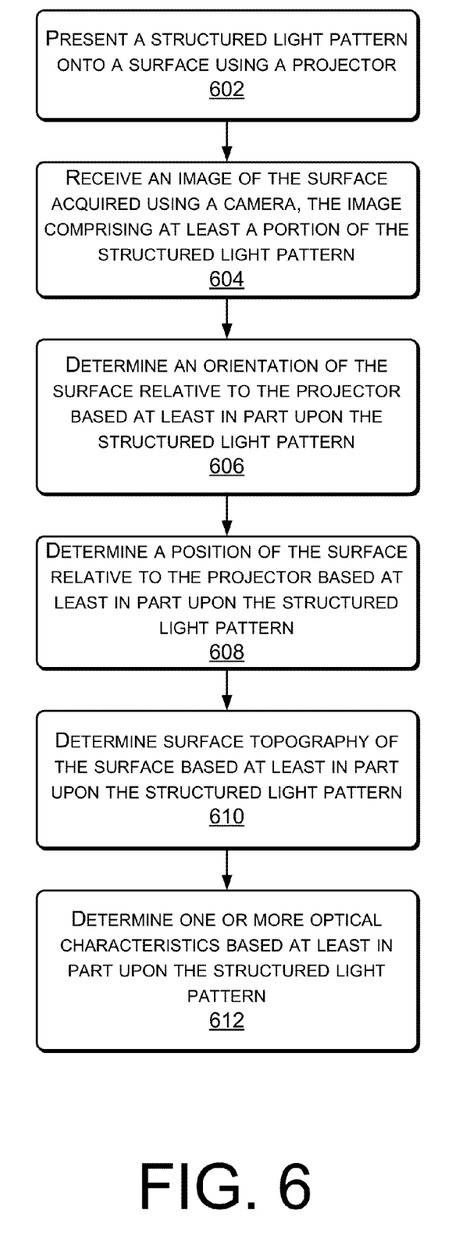
FIG. 6 illustrates a process for determining surface data of the surfaces.

FIG. 6 illustrates a process 600 for determining the surface data 502 of the surfaces in the environment. As described below with regards to FIG. 8, the surface data 502 may then be used in conjunction with the projection data 402 to select projection surfaces. The surface data 502 may be acquired for all surfaces within the environment 100, or be limited to particular surfaces, such as those in the working region.

At 602, a structured light pattern is presented onto a surface using the projector 206. This structured light pattern may be projected using visible light images perceptible to the user, visible light images imperceptible to the user, images with non-visible light, or a combination thereof. For example, the structured light images may use visible light but be projected for a duration such that the user 302 cannot perceive the image. Or the image may be projected using infrared or ultraviolet light which cannot be detected by the human eye.

At 604, an image of the surface as acquired using the camera 210 is received, the image comprising at least a portion of the structured light pattern. For example, the camera 210 may only be able to image a left of the structured light pattern on the surface due to an obstruction.

At 606, an orientation of the surface relative to the projector 206 is determined, based at least in part upon the structured light pattern. For example, by observing the apparent skew and distortion of the structured light pattern, a relative angle between the projector 206 and the surface may be determined. In other implementations, the orientation may be relative to a designated origin, the camera 210, or other location.

At 608, a position of the surface relative to the projector 206 is determined based at least in part upon the structured light pattern. For example, the surface may be determined to be at coordinates (123, 247, 115) in an X,Y,Z system relative to a designated origin. In other implementations, the position may be relative the camera 210 or other location.

At 610, surface topography of the surface is determined, based at least in part upon the structured light pattern. For example, the topography 508 of the surface may be determined to be planar and relatively smooth.

At 612, one or more optical characteristics are determined, based at least in part upon the structured light pattern. For example, the structured light pattern may comprise portions such as pixels or groups of pixels with different colors. By acquiring images with the camera 210 of these different colors interacting with the surface, the surface color 514 may be determined. By measuring intensity of portions of the structured light pattern, such as light and dark portions, the reflectivity 516 may be determined.

Figure 7:
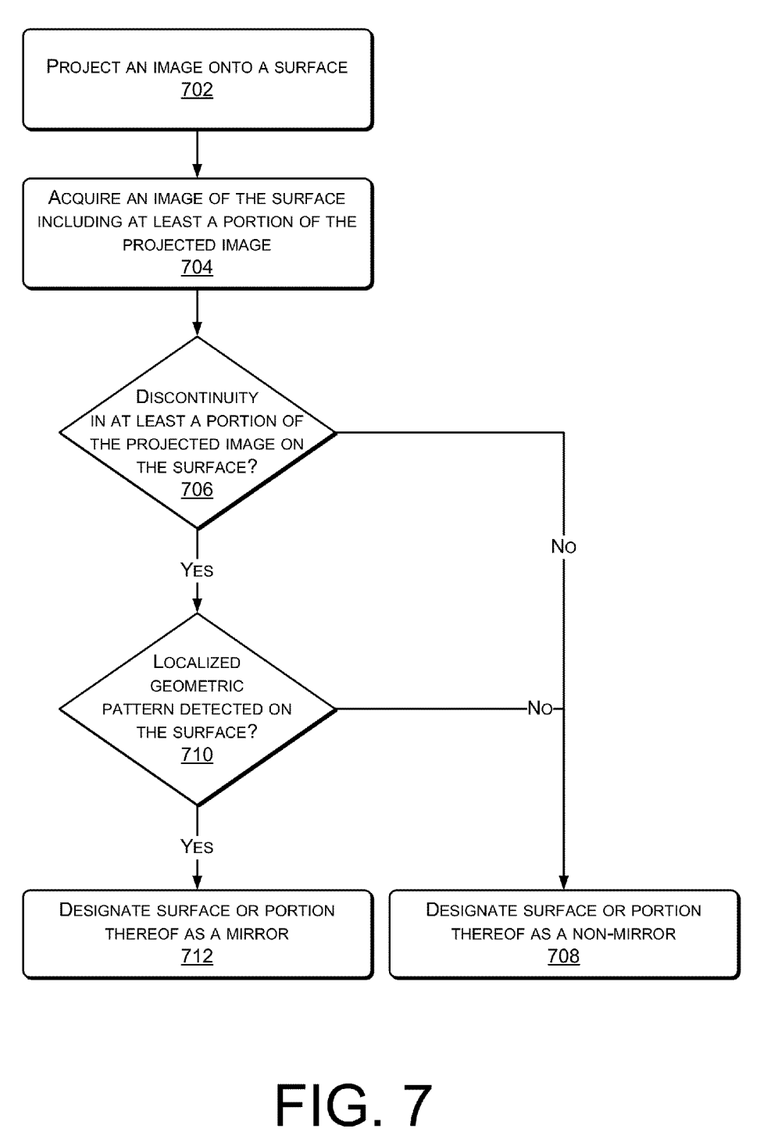
FIG. 7 illustrates a process for designating a surface or portion thereof as a highly-reflective surface.

FIG. 7 illustrates a process 700 for designating a surface or portion thereof as a highly-reflective surface. Highly reflective surfaces, such as a glossy tabletop, mirror, window with a reflective coating, and so forth may not be suitable projection surfaces. These surfaces may not present the image properly, and may also be uncomfortable for the user by reflecting intense projection light directly into the user's eyes. Thus, it is worthwhile to determine highly reflective surfaces within the environment 100 so that they may be disqualified as potential projection surfaces, or used for other purposes such as redirection of an image around an obstacle.

At 702, a projected image is projected onto a surface. This projected image may comprise a structured light pattern. At 704, an image of the surface is acquired, including at least a portion of the projected image.

At 706, a determination is made as to whether a discontinuity in at least a portion of the projected image is detected on the surface. This discontinuity may be a portion of the projected image being missing, inverted, distorted in a different way than the remainder of the image, and so forth. For example, an image projected onto a mirror, reflected, and appearing on a wall is "flipped." When no discontinuity is detected at 706, the process proceeds to 708 where the surface or a portion thereof 708 is designated as a non-mirror.

When discontinuity is detected at 706, the process may proceed to 710. At 710, a determination is made as to whether a localized geometric pattern is detected on the surface. A localized geometric pattern is a light pattern on the surface which is within a defined region and has a geometric shape, as distinguished from a diffuse and amorphous pattern. For example, common mirrors such as the mirror 314 in the room, may not provide 100% reflectivity of incident light. When a light is shone upon those mirrors, at least a portion of that incident light is reflected back towards the projector 206, or scattered on the mirror surface. The camera 210 may detect this slightly reflected light, such as in the form of a circle, ellipse, rectangle, parallelepiped or so forth, present within the discontinuity. When no localized geometric pattern is detected on the surface at 710, the process proceeds to 708 and the surface is designated as a non-mirror.

When the localized geometric pattern is detected at 710, the process proceeds to 712. At 712, the surface or a portion thereof is designated as a mirror. Once designated as a mirror, the projection surface qualification module 114 may designate the mirrored area as being unsuitable for projection, and remove that surface from consideration as a potential projection surface. In other implementations, the designated mirror may be used to redirect the projected image to another surface. For example, the mirror may be used to bounce the image around an obstruction.

In some implementations, the determinations of 706 or 710 may be used independently. For example, the discontinuity determination may be used to determine the mirrored surface without using the determination of the localized geometric pattern 710, or vice versa.

Figure 8:
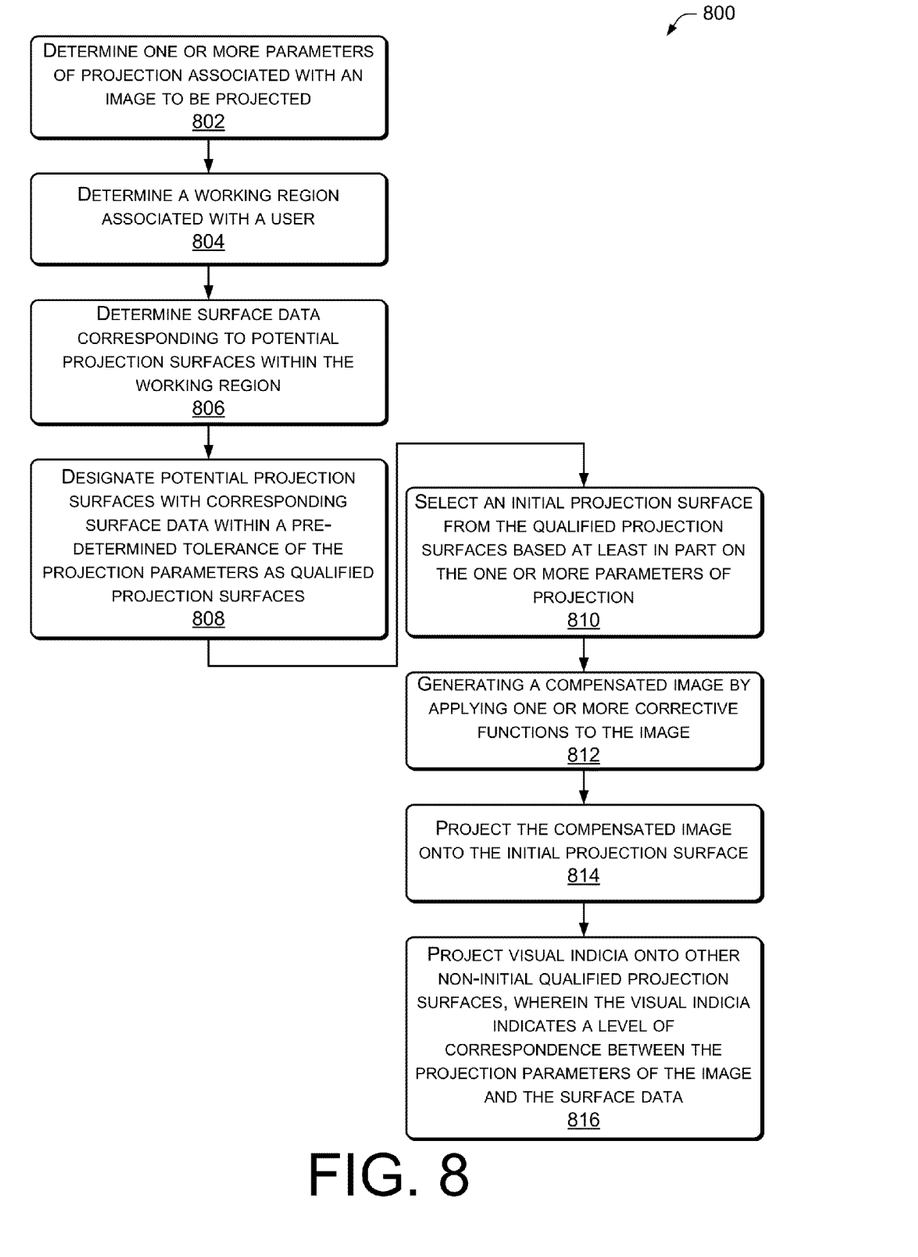
FIG. 8 illustrates a process for qualifying and selecting surfaces in the augmented reality environment.

FIG. 8 illustrates a process 800 for qualifying and selecting surfaces in the augmented reality environment. The projection surface qualification module 114 may implement the following process.

At 802, one or more parameters of projection 402 associated with an image to be projected are determined. For example, the image to be projected may be determined to have a desired effective resolution 404 of at least 80 PPI and comprise the image type 418 of text.

At 804, the working region 322 associated with the user 302 is determined. For example, the working region 322 may be associated with the user 302 by tracking an orientation of the user 324 in the environment, tracking a gaze of the user 302, or a combination thereof. In another implementation, the working region 322 may be determined by analyzing the relative position and orientation of one or more parts of the user's 302 body. For example, the relative position of the head, shoulders, hands, and feet may be used to designate the working region 322.

At 806, the surface data 502 corresponding to potential projection surfaces within the working region 322 is determined. As described above, this surface data 502 may be retrieved, determined using sensors, or a combination thereof. For example, surface data 502 may be retrieved from the object datastore 116 when an object has been identified.

At 808, potential projection surfaces with corresponding surface data 502 within a pre-determined tolerance of the parameters of projection 402 are designated as qualified projection surfaces. For example, where the surface data 502 places the position 504 of the surface close enough to meet the desired effective resolution desired 404 of 80 PPI, the surface may be designated as a qualified projection surface.

At 810, an initial projection surface is selected from the qualified projection surfaces based at least in part on the one or more parameters of projection. The initial projection surface may be selected by comparing the one or more parameters of projection to the surface data of the qualified projection surfaces. For example, the qualified projection surface which exhibits a variance between the one or more of the parameters of projection and the surface data which is below a threshold value may be selected as the initial projection surface. The initial projection surface may be considered to be the projection surface which has surface data 502 most closely fitting a weighting of one or more of the parameters of projection 402.

At 812, a compensated image is generated by applying one or more corrective functions to the image. For example, where the surface data indicates a particular orientation 506 of the initial projection surface, the image may be skewed before projection such that, upon presentation on the surface, the image appears to the user 302 to be relatively undistorted or unskewed. Other corrections may include varying the colors of the projected image to account for a colored projection surface, increasing intensity of the projected light to account for a darker surface, and so forth.

At 814, the compensated image is projected onto the initial projection surface. Thus, the user 302 sees the projected image on the best available surface, compensated to provide a projected image which is representative of the intended image.

At 816, visual indicia are projected onto other non-initial or secondary, tertiary, and so forth qualified projection surfaces. These visual indicia may indicate a level of correspondence between the parameters of projection 402 of the image and the surface data 502. For example, a green icon within a first non-initial qualified projection surface may indicate the particular surface is a reasonably good match. In contrast, a red icon within a second non-initial qualified projection surface may indicate that the particular surface is a poor match, such as one which would introduce distortion beyond the maximum permissible image distortion 406.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A system comprising:
   one or more processors;
   a projector coupled to the one or more processors and configured to project a projected image in an environment;
   a camera coupled to the one or more processors and configured to acquire images of the environment;
   a memory coupled to the one or more processors and configured to store one or more modules configured for execution on the one or more processors to:
      determine one or more parameters of projection associated with the projected image to be projected by the projector within the environment;
      determine a working region of the environment associated with a user;
      determine surface data corresponding to potential projection surfaces within the working region;
      designate one or more potential projection surfaces with corresponding surface data within a pre-determined tolerance of one or more of the parameters of projection as qualified projection surfaces;
      select an initial projection surface onto which to project the image from the qualified projection surfaces based at least in part on the one or more parameters of projection; and
      project the image onto the initial projection surface using the projector.

2. The system of claim 1, the selection of the initial projection surface comprising comparing the one or more parameters of projection to the surface data of the qualified projection surfaces.

3. The system of claim 1, the projection parameters for the image comprising one or more of:
   a desired effective resolution;
   a maximum permissible image distortion;
   a maximum permissible color distortion;
   one or more user preferences;
   one or more equipment constraints;
   color depth range; or
   image type.

4. The system of claim 1, the determining of the working region associated with the user comprising one or more of tracking an orientation of the user, tracking a gaze of the user, or a combination thereof.

5. The system of claim 1, the determining of the surface data corresponding to potential projection surfaces within the working region comprising illuminating the potential projection surfaces with light of different frequencies and acquiring with the camera corresponding images of the surfaces during the illuminating.

6. The system of claim 1, the determining of the surface data corresponding to potential projection surfaces within the working region comprising identifying an object associated with at least one of the potential projection surfaces and retrieving information about the object from a datastore.

7. The system of claim 1, the one or more modules further configured to apply one or more corrective functions to the image prior to the projecting.

8. The system of claim 7, wherein the one or more corrective functions alter color of the image prior to the projecting at least partly based on the surface data.

9. The system of claim 1, the one or more modules further configured to project visual indicia onto at least one qualified projection surface that is not the initial projection surface.

10. The system of claim 9, wherein the visual indicia indicates a level of correspondence between the projection parameters of image and the surface data.

11. One or more non-transitory computer-readable medium storing computer-executable instructions that, when executed, cause one or more processors to perform acts comprising:
   determining one or more parameters of projection for a projected image;
   determining a working region of an environment associated with a user;
   determining surface data corresponding to potential projection surfaces within the working region;
   designating one or more of the potential projection surfaces as qualified projection surfaces based at least in part on the surface data; and
   selecting a qualified projection surface onto which to project the projected image from the one or more qualified projection surfaces based at least in part on the parameters of projection associated with the projected image and the surface data.

12. The one or more non-transitory computer-readable medium of claim 11, the determining the working region comprising determining an orientation and position of at least a portion of a human body.

13. The one or more non-transitory computer-readable medium of claim 11, wherein the selected qualified projection surface exhibits a variance between one or more of the parameters of projection and the surface data of the qualified projection surface which is below a threshold.

14. The one or more non-transitory computer-readable storage media of claim 11, wherein the determining the surface data comprises:
   projecting an image comprising structured light onto a potential projection surface;
   acquiring an image of the potential projection surface including at least a portion of the projected image;
   when a discontinuity in at least a portion of the projected image on the surface is not detected, designating the potential projection surface or a portion thereof as a non-mirror; and
   when the discontinuity is detected, determining when a localized geometric reflective pattern is detected on the potential projection surface;
   when the localized geometric reflective pattern is not detected on the potential projection surface, designating the potential projection surface or a portion thereof as a non-mirror;
   when the localized geometric reflective pattern is detected on the potential projection surface, designating the potential projection surface or a portion thereof as a mirror.

15. The one or more non-transitory computer-readable storage media of claim 11, wherein the determining the surface data comprises one or more of:
   determining orientation of each of the potential projection surfaces relative to a projector;
   determining a position of each of the potential projection surfaces relative to the projector;
   determining a surface topography of each of the potential projection surfaces; or
   determining one or more optical characteristics of each of the potential projection surfaces.

16. The one or more non-transitory computer-readable storage media of claim 15, wherein the determining the surface data further comprises:
   projecting one or more structured light patterns on the potential projection surface with the projector; and
   receiving one or more acquired images comprising at least a portion of the one or more structured light patterns from a camera.

17. A system comprising:
   one or more processors;
   a memory coupled to the one or more processors and configured to store instructions for execution on the one or more processors, the instructions configured to:
   determine a working region in an environment based at least in part upon a position of at least one part of a human body;
   designate an initial projection surface onto which to project a projected image from a plurality of surfaces in the working region based at least in part upon a comparison of one or more parameters of projection with one or more surface data attributes of the plurality of surfaces obtained at least in part using structured light; and
   initiate projection of the projected image onto the initial projection surface.

18. The system of claim 17, the structured light comprising a plurality of structured light patterns, the patterns comprising a plurality of colors of light.

19. The system of claim 17, the instructions further configured to correct the image before or during projection.

20. The system of claim 17, the determining of the working region comprising defining a volume of the environment based at least on one or more user preferences defining a disposition of a projection surface relative to the position of the at least one body part.

* * * * *